3,356,620
PROCESS FOR PREPARING CRYSTALLINE POLY (TRANS-2-BUTENE OXIDE)
Ralph W. Body, Wilmington, Del., assignor to Hercules Incorporated, a corporation of Delaware
No Drawing. Filed Sept. 17, 1964, Ser. No. 397,303
12 Claims. (Cl. 260—2)

ABSTRACT OF THE DISCLOSURE

An improved catalyst for the polymerization of trans-2-butene oxide is a trialkylaluminum reacted with chloral hydrate or a polyol containing at least 2 vicinal hydroxyls. The products of this invention are useful in application such as films, fibers, coatings and molded plastics.

---

This invention relates to the preparation of crystalline homopolymers of trans-2-butene oxide and more particularly to a novel process for the preparation of crystalline poly(trans-2-butene oxide).

Poly(trans-2-butene oxide) is a comparatively new crystalline polymeric material having properties which make it very attractive for use as a packaging film. More particularly, crystalline poly(trans-2-butene oxide) has a crystalline melting point of about 100° C. and a density of 1.02 grams per cc. It is readily formed by conventional methods into films which have excellent strength and flexibility and which are crystal clear, colorless and sparkling. Such films are unaffected by water, alcohols, ketones, petroleum hydrocarbons, vegetable and animal fats, etc. Such films can be uniaxially or biaxially oriented by conventional cold drawing techniques, and the oriented films have high moisture vapor transmission, are easily heat sealed, have excellent low-temperature flexibility, have unusually good heat shrinkage characteristics, and the heat-shrunk films have low shrink tension.

Heretofore, crystalline homopolymers of trans-2-butene oxide have been prepared with trialkylaluminum catalysts or with catalysts made by reacting an alkylaluminum compound with about 0.5 to 1 mole of water per mole of alkylaluminum compound.

Now, in accordance with this invention, it has been discovered that crystalline polymers of trans-2-butene oxide can be prepared by contacting essentially pure monomeric trans-2-butene oxide under essentially anhydrous conditions and in an inert atmosphere with a catalyst formed by reacting together in an inert atmosphere essentially anhydrous ingredients consisting essentially of an alkylaluminum compound selected from the group consisting of trialkylaluminums and dialkylaluminum hydrides and a saturated aliphatic polyhydroxy compound selected from the group consisting of chloral hydrate, vicinal diols, and polyols having more than 2 hydroxyls, each of said hydroxyls being attached to different carbon atoms, each of said different carbon atoms being adjacent to at least one other carbon atom having a hydroxyl substituent.

It has been found that when diols in which the hydroxyl groups are attached to two different carbon atoms which are not adjacent to each other are used to modify the alkylaluminum compound, as specified above, the resulting modified alkylaluminum compounds are not catalysts for polymerization of trans-2-butene oxide to crystalline poly(trans-2-butene oxide). Typical of diols which are ineffective for the purposes of this invention are, for example, 1,3-propanediol and diethylene glycol. Moreover, it has been found further that the catalysts of this invention are highly specific for effecting the polymerization of trans-2-butene oxide and are inoperative for effecting polymerizations of cis-2-butene oxide or isobutylene oxide.

Essentially pure trans-2-butene oxide is required for the purposes of this invention. By the term "essentially pure trans-2-butene oxide" is meant material containing no appreciable amount of reactive impurities, i.e., impurities which react either with the catalyst to inactivate the catalyst, such, for example, as water, alcohols, ethers, and the like, or other cyclic ethers such as isobutylene oxide or cis-2-butene oxide, which can copolymerize with trans-2-butene oxide. Such cyclic ether impurities materially detract from the production of crystalline polymers of poly (trans-2-butene oxide) and tend to yield only amorphous rubberlike polymers. Trans-2-butene oxide of the above-indicated degree of purity is produced from commercial grades of trans-2-butene oxide by conventional distillation and dehydration techniques. Small amounts of inert impurities, i.e., impurities such as an aromatic or petroleum hydrocarbon or a chlorinated hydrocarbon, which do not react with the catalyst or copolymerize with the trans-2-butene oxide, have no effect on the production of crystalline poly(trans-2-butene oxide), and permissibly may be present in the essentially pure trans-2-butene oxide of this invention.

The alkylaluminum compounds used to prepare the catalysts of this invention may be any trialkylaluminum or dialkylaluminum hydride in which the alkyl group is either straight chain or branched chain. Some typical alkylaluminum compounds within the purview of this invention include, for example, trimethylaluminum, triethylaluminum, tripropylaluminum, triisopropylaluminum, straight and branched chain tributylaluminums, straight and branched chain triamylaluminums, straight and branched chain trihexylaluminums, straight and branched chain trioctylaluminums, and the like, dimethylaluminum hydride, diethylaluminum hydride, dipropylaluminum hydride, diisopropylaluminum hydride, diisobutylaluminum hydride, dihexylaluminum hydride, dioctylaluminum hydride, and the like.

Saturated aliphatic polyhydroxy compounds utilized to prepare the catalysts of this invention include chloral hydrate, vicinal diols, and vicinal polyols having more than 2 hydroxyls.

In chloral hydrate both hydroxyls are attached to the same carbon atom, and this compound is the only known example of a stable geminal diol. In general, organic compounds cannot have 2 hydroxyls on the same carbon atom, although derivatives of such compounds; namely, hemiacetals, acetals, and diacetates are known.

Any vicinal diol, i.e., any diol in which the hydroxyls are attached to adjacent carbon atoms is suitable for the purposes of this invention. Some typical vicinal diols include by way of example, ethylene glycol, 1,2-propane diol, 1,2-butane diol, 2,3-butane diol, 2-methyl-1,2-propane diol, 1,2-pentane diol, 2-3-pentane diol, 2-methyl-3,4-butane diol, 3-methyl-3,4-butane diol, 1,1-dimethyl-2,3-propane diol, 1,2-hexane diol, 2,3-hexane diol, 3,4-hexane diol, 2-methyl-4,5-pentane diol, 1,2-octane diol, 2,3-octane diol, 4,5-octane diol, 2-dimethyl-5,6-hexane diol, 1-chloro-2,3-propane diol, and the like. Ethylene glycol is the preferred vicinal diol for the purposes of this invention.

Any vicinal polyol having more than 2 hydroxyls is also suitable for the purposes of this invention. In vicinal polyols having more than 2 hydroxyl groups, each hydroxyl is attached to a different carbon atom, and each such hydroxyl-substituted carbon atom is adjacent to at least one other hydroxyl-substituted carbon. Some typical vicinal polyols include, by way of example, 1,2,3-trihydroxy propane (glycerol), 1,2,3-trihydroxy butane, 1,2,3-trihydroxy pentane, 2,3,4-trihydroxy pentane, 1,2,3-trihydroxy hexane, 2,3,4-trihydroxy hexane, 2-methyl-3,4,5-trihydroxy pentane, 1,2,3-trihydroxy octane, 2,3,4-trihydroxy octane, 3,4,5-trihydroxy octane, 2-methyl-5,6,7-trihydroxy heptane, 1,2,3,4-tetrahydroxy butane, 1,2,3,4-tetrahydroxy pentane, 1,2,3,4,5-pentahydroxy pentane, sorbitol, and the like.

The catalysts of this invention are prepared by reacting a selected alkylaluminum compound with an essentially anhydrous polyhydroxy compound, as described above, in an inert atmosphere at a temperature from about −100° C. to about 150° C., preferably from about −50° C. to about 100° C., or more preferably from about −20° C. to about 50° C., employing an amount of the polyhydroxy compound corresponding to from about 0.2 to about 3.0 moles, preferably from about 0.3 to about 2.0 moles of hydroxyl group per mole of aluminum in the alkylaluminum compound, or more preferably from about 0.4 to about 1.2 moles of hydroxyl groups per mole of aluminum in the alkylaluminum compound.

A convenient procedure for preparing the catalysts of this invention is to inject the polyhydroxy compound, dried, for example, by means of a molecular sieve, gradually into the alkylaluminum compound with agitation in a closed reaction vessel from which air has been displaced by an inert gas, such as nitrogen or argon or neon. The polyhydroxy compound may be added in increments or continuously, as desired. Although the alkylaluminum compound can be employed in an undiluted state, it is more convenient to dilute the alkylaluminum compound with a dry, inert reaction diluent which may be a saturated aliphatic hydrocarbon such as heptane or octane, an aromatic hydrocarbon such as benzene, toluene, or xylene, or a chlorinated hydrocarbon such as methylene chloride, carbon tetrachloride, chlorobenzene, and the like. For example, a 0.5 M to 1 M solution of the alkylaluminum compound in dry heptane is very practical and convenient for preparing the catalysts of this invention. The catalysts formed by reacting an alkylaluminum compound with a polyhydroxy compound in accordance with this invention may be used immediately or may be stored out of contact with air for later use.

The polymerization of trans-2-butene oxide with the catalysts of this invention may be carried out at any temperature within the range from about −150° C. to about 100° C. Generally, however, temperatures less than about 50° C. are preferable; and still more preferable are temperatures less than 30° C., since lower temperatures favor production of polymers of higher reduced specific viscosity and, hence, higher molecular weight. The polymerization reaction is very rapid, almost instantaneous, even at temperatures as low as −78° C., and the yield of crystalline polymer is high, even at very low temperatures.

The polymerization may be carried out in bulk, i.e., with the monomer in a substantially undiluted state, but generally is carried out in a solution or suspension in a dry inert, liquid, organic diluent. Exemplary of the diluents that may be used are the saturated aliphatic and cycloaliphatic hydrocarbons such as heptane, octane, cyclohexane, and the like, aromatic hydrocarbons such as benzene, toluene, xylene, ethyl benzene, and the like, and chlorinated hydrocarbons such as methylene chloride, tetrachloroethane, ethylene dichloride, trichloroethane, chlorobenzene, and the like. In general, chlorinated hydrocarbons such as methylene chloride are preferred over the hydrocarbons as favoring production of higher molecular weight polymers; and aromatic hydrocarbons in turn are preferred over saturated aliphatic hydrocarbons because the resulting polymeric product formed generally remains soluble in the aromatic hydrocarbon diluent but precipitates out of aliphatic hydrocarbon diluent.

Any amount of the reaction product of alkylaluminum compound—polyhydroxy compound may be used to catalyze the polymerization process in accordance with this invention from a minor catalytic amount up to a large excess but, in general, will be within the range of from about 0.05 to about 10 mole percent based on monomeric trans-2-butene oxide weight and, preferably, will be within the range of from about 0.1 to about 5 mole percent of the trans-2-butene oxide being polymerized. The catalyst may be added all at one time, at the beginning of the polymerization, in increments at intervals during the polymerization, or continuously throughout the polymerization.

The polymerization may be carried out under any desired pressure, i.e., at subatmospheric, atmospheric, or superatmospheric pressure. Usually, however, the polymerization is carried out at pressures from about 1 to about 2 atmospheres.

Upon completion of the polymerization reaction, the catalyst is decomposed by adding an alcohol such as ethanol to the polymerization reaction mixture which is then washed with dilute aqueous acid and then with water until neutral. The polymer is recovered by evaporation of the polymerization reaction diluent. Alternatively, the polymer may be recovered by precipitating the polymer from the reaction mixture solution by dilution of the reaction mixture solution with a large excess of a nonsolvent for the polymer, such as methanol, or ethanol, or a saturated aliphatic hydrocarbon. If desired, catalyst decomposition residues may be left in the polymer produced, instead of washing them out. Moreover, it is customary practice to add to the polymerization reaction mixture an antioxidant for the crystalline poly(trans-2-butene oxide) product, such as 4,4′-thiobis(6-tert-butyl-m-cresol), prior to recovery of the product.

The general nature of the invention has been set forth, and the following examples illustrate some specific embodiments thereof, parts and percentages being by weight unless otherwise specified. The molecular weight of the polymers produced in the examples is indicated by the reduced specific viscosity (RSV) given therein. By the term "reduced specific viscosity" is meant the specific viscosity, $\eta/sp.$, divided by the concentration, C, of the polymer as determined on a 0.1 g. solution of the polymer in 100 ml. of chloroform at 25° C.

*Example 1*

A catalyst was prepared by reacting together essentially anhydrous ingredients consisting of triisobutylaluminum and ethylene glycol in the proportions of 0.5 mole of ethylene glycol to 1 mole of triisobutylaluminum in an inert atmosphere and in the presence of dry heptane as the inert reaction diluent. The catalyst preparation was carried out in a closed reaction vessel from which air had been displaced by nitrogen by charging thereto at room temperature 43 parts of a 25% by weight solution of triisobutylaluminum in heptane and 34 parts of dry heptane, and cooling to 0° C. while being agitated. A quantity of 1.55 parts of ethylene glycol which was dried by means of a commercial molecular sieve (Linde molecular sieve 4a) was then injected gradually into the heptane solution of triisobutylaluminum at 0° C. with continued agitation at a rate such that gas was continuously evolved. Agitation was continued until gas evolution ceased, thus indicating completion of the reaction between the triisobutylaluminum and the ethylene glycol. This catalyst solution was used in the following polymerization reaction:

To a closed polymerization vessel from which air had been removed and replaced by nitrogen was charged 2 parts of essentially pure trans-2-butene oxide and 4.3 parts of dry toluene at room temperature. The vessel and contents were cooled to 0° C., and 1.2 parts of the above catalyst solution were then added. After standing for 3 hours at 0° C., one part of ethanol was added to the polymerization reaction mixture to decompose the residual catalyst and thus stop the polymerization reaction; and the reaction mixture solution was washed continuously for 0.5 hour with water containing 3% of hydrogen chloride, and then with water until neutral. A quantity of 0.01 part of 4,4'-thiobis(6-tert-butyl-m-cresol) was then added to the washed reaction mixture solution, and the reaction diluent was evaporated to yield 1.66 parts of poly(trans-2-butene oxide) which was shown to have a high degree of crystallinity by its X-ray diffraction pattern. This crystalline polymer had an RSV of 1.2.

*Example 2*

The same catalyst solution, polymerization vessel, and polymer preparation procedure described in Example 1 were employed in this example to effect polymerization of 10 parts of essentially pure trans-2-butene oxide dissolved in 85 parts of dry toluene as reaction diluent, employing 5.8 parts of the catalyst solution. After 1.5 hours at 0° C., approximately 5 parts of ethanol were employed to decompose residual catalyst and thus stop the polymerization reaction, and 0.05 part of 4,4'-thiobis-(6-tert-butyl-m-cresol) was added to the washed reaction mixture solution prior to recovery of the polymer product by evaporation of the reaction diluent. There was obtained 5.9 parts of poly(trans-2-butene oxide) which was shown to have a high degree of crystallinity by its X-ray diffraction pattern. This crystalline polymer had an RSV of 0.69.

*Example 3*

The same catalyst solution, polymerization vessel, and polymer preparation procedure described in Example 1 were employed in this example to effect polymerization of 10 parts of essentially pure trans-2-butene oxide dissolved in 130 parts of dry methylene chloride as reaction diluent, employing 5.8 parts of the catalyst solution. After 1.5 hours at 0° C., approximately 5 parts of ethanol were employed to decompose residual catalyst and thus stop the polymerization reaction, and 0.05 part of 4,4'-thiobis(6-tert-butyl-m-cresol) was added to the washed reaction mixture solution prior to recovery of the polymer product by evaporation of the reaction diluent. There was obtained 8.8 parts of poly(trans-2-butene oxide) which was shown to have a high degree of crystallinity by its X-ray diffraction pattern. This crystalline polymer had an RSV of 1.8.

*Example 4*

A catalyst was prepared by reacting together essentially anhydrous ingredients consisting of triethylaluminum and ethylene glycol in the proportions of 0.5 mole of ethylene glycol to 1 mol of triethylaluminum in an inert atmosphere and in the presence of dry heptane as the inert reaction diluent. The catalyst preparation was carried out in a closed reaction vessel from which air had been displaced by nitrogen by charging thereto at room temperature 14 parts of a 25% by weight solution of triethylaluminum in heptane and 26 parts of dry heptane, and cooling to 0° C. while being agitated. A quantity of 0.87 part of ethylene glycol which was dried by means of a commercial molecular sieve (Linde molecular sieve 4a) was then injected gradually into the heptane solution of triethylaluminum at 0° C. with continued agitation at a rate such that gas was continuously evolved. Agitation was continued until gas evolution ceased, thus indicating completion of the reaction between triethylaluminum and ethylene glycol.

The above catalyst solution was employed, utilizing the same polymerization vessel and the same polymer preparation procedure described in Example 1, to effect polymerization of 10 parts of essentially pure trans-2-butene oxide dissolved in 130 parts of dry methylene chloride as reaction diluent, employing 5.8 parts of the triethylaluminum—ethylene glycol catalyst solution described above. After 2 hours at 0° C., approximately 5 parts of ethanol were employed to decompose residual catalyst and thus stop the polymerization reaction, and 0.05 part of 4,4'-thiobis(6-tert-butyl-m-cresol) was added to the washed reaction mixture solution prior to recovery of the polymer by evaporation of the reaction diluent. There was obtained 6.8 parts of poly(trans-2-butene oxide) which was shown to have a high degree of crystallinity by its X-ray diffraction pattern. This crystalline polymer had an RSV of 1.8.

*Example 5*

The catalyst employed in this example was prepared by the method described in Example 1 by diluting 19 parts of a 25% by weight solution of triisobutylaluminum in heptane with 17 parts of dry heptane, and gradually injecting 0.76 part of glyceral (1,2,3-trihydroxy propane) which had been dried by means of a molecular sieve (Linde molecular sieve 4a) into the agitated triisobutylaluminum solution. The resulting catalyst solution was used in the following bulk polymerization of trans-2-butene oxide:

To a closed polymerization vessel from which air had been removed and replaced by nitrogen was charged 5 parts of essentially pure trans-2-butene oxide at room temperature. The vessel and contents were cooled to 0° C., and 1.5 parts of the above catalyst solution were then added. After standing 2 hours at 0° C., 1 part of ethanol was added to the polymerization reaction mixture to decompose residual catalyst, approximately 0.02 part of 4,4'-thiobis(6-tert-butyl-m-cresol) was added to the polymerized product, and the polymerized product containing the decomposed catalyst residues was freed of heptane, introduced with the catalyst, by drying. There was obtained 4.8 parts of poly(trans-2-butene oxide) which was shown to be highly crystalline by its X-ray diffraction pattern. This crystalline polymer had an RSV of 0.59.

*Example 6*

The catalyst employed in this example was prepared by the method described in Example 1 by diluting 15 parts of a 25% by weight solution of triisobutylaluminum in heptane with 7 parts of dry heptane and gradually injecting 9 parts of a dry toluene solution containing 1.7 parts of chloral hydrate which had been dried by means of a molecular sieve (Linde molecular sieve 4a) in to the agitated triisobutylaluminum solution. The resulting catalyst solution was used in the following bulk polymerization of trans-2-butene oxide:

To a closed polymerization vessel from which air had been removed and replaced by nitrogen was charged 5 parts of essentially pure trans-2-butene oxide at room temperature. The vessel and contents were cooled to 0° C., and 1.5 parts of the above catalyst solution were then added. After standing 2 hours at 0° C., 1 part of ethanol was added to the polymerization reaction mixture to decompose residual catalyst, approximately 0.02 part of 4,4'-thiobis(6-tert-butyl-m-cresol) was added to the polymerized product, and the polymerized product containing the decomposed catalyst residues was freed of heptane and toluene, introduced with the catalyst, by drying. There was obtained 3.7 parts of poly(trans-2-butene oxide) which was shown to be highly crystalline by its X-ray diffraction pattern. This crystalline polymer had an RSV of 0.33.

The high molecular weight crystalline poly(trans-2-butene oxide) products produced by this invention are useful in a wide variety of applications, including film, fibers, coatings, molded plastics, and the like.

What I claim and desire to protect by Letters Patent is:
1. A process for preparing highly crystalline poly(trans-2-butene oxide) which comprises polymerizing essentially pure monomeric trans-2-butene oxide by contacting, at a temperature within the range of from about −150° C. to about 100° C., said monomeric trans-2-butent oxide under essentially anhydrous conditions and in an inert atmosphere with a catalyst formed by reacting together in an inert atmosphere essentially anhydrous ingredients consisting essentially of an alkylaluminum compound selected from the group consisting of trialkylaluminums and di- alkylaluminum hydrides, wherein said alkyl groups contain from 1 to 8 carbon atoms, and a saturated aliphatic polyhydroxy compound selected from the group consisting of chloral hydrate, vicinal alkane diols, and vicinal alkane polyols having more than 2 hydroxyls, said saturated aliphatic polyhydroxy compound being employed in an amount corresponding to from about 0.2 to about 3 moles of hydroxyl group per mole of aluminum in said alkylaluminum compound.

2. The process in accordance with claim 1 in which the saturated aliphatic polyhydroxy compound is employed in an amount corresponding to from about 0.3 to about 2 moles of hydroxyl group per mole of aluminum in the alkylaluminum compound.

3. The process in accordance with claim 1 in which the saturated aliphatic polyhydroxy compound is employed in an amount corresponding to from about 0.4 to about 1.2 moles of hydroxyl group per mole of aluminum in the alkylaluminum compound.

4. The process in accordance with claim 1 in which the saturated aliphatic polyhydroxy compound is chloral hydrate.

5. The process in accordance with claim 1 in which the saturated aliphatic polyhydroxy compound is ethylene glycol.

6. The process in accordance with claim 1 in which the saturated aliphatic polyhydroxy compound is glycerol.

7. The process in accordance with claim 1 in which the alkylaluminum compound is triethylaluminum.

8. The process in accordance with claim 1 in which the alkylaluminum compound is triisobutylaluminum.

9. The process in accordance with claim 1 in which the catalyst is the reaction product of 0.5 mole of ethylene glycol with 1 mole of triethylaluminum.

10. The process in accordance with claim 1 in which the catalyst is the reaction product of 0.5 mole of ethylene glycol with 1 mole of triisobutylaluminum.

11. The process in accordance with claim 1 in which the catalyst is the reaction product of 0.5 mole of glycerol with 1 mole of triisobutylaluminum.

12. The process in accordance with claim 1 in which the catalyst is the reaction product of 0.5 mole of chloral hydrate with 1 mole of triisobutylaluminum.

References Cited

UNITED STATES PATENTS

| 3,065,187 | 11/1962 | Vandenberg | 260—2 |
| 3,280,045 | 10/1966 | Vandenberg | 260—2 |

FOREIGN PATENTS 870,418    6/1961    Great Britain.

WILLIAM H. SHORT, *Primary Examiner.*

T. E. PERTILLA, *Assistant Examiner.*